June 4, 1968  F. WUNDER ETAL  3,386,492
METHOD OF REBUILDING WHEELS
Filed March 23, 1965
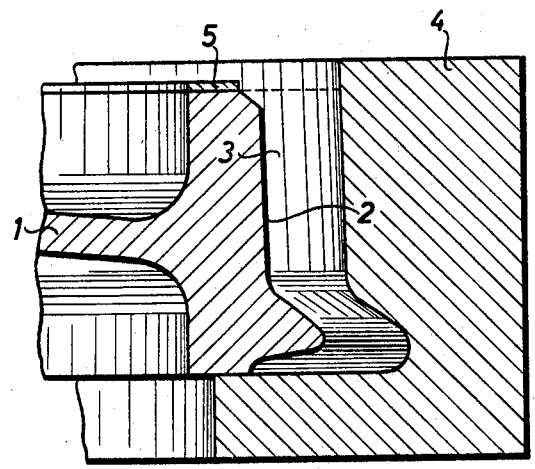
INVENTORS
Friedrich Wunder
Wilhelm Koerner
by Michael J. Striker
Atty

United States Patent Office 3,386,492
Patented June 4, 1968

3,386,492
METHOD OF REBUILDING WHEELS
Friedrich Wunder and Wilhelm Körner, Darmstadt, Germany, assignors to Wilhelm Hegenscheidt Kommanditgesellschaft, Erkelenz, Rhineland, Germany
Filed Mar. 23, 1965, Ser. No. 442,047
Claims priority, application Germany, Mar. 24, 1964, K 52,479
7 Claims. (Cl. 164—92)

ABSTRACT OF THE DISCLOSURE

A process of rebuilding worn wheels of rail-supported vehicles comprising the steps of applying a scale resistant protective skin to the rim of the wheel; then preheating the rim; then introducing it into a casting mold and pouring molten metal into the mold and in contact with the rim, the preheating temperature being sufficiently high to permit formation of an intimate homogeneous welding bond by heat transfer between the molten metal and the wheel rim and the scale resistant skin being formed of a material which preserves its scale resistance at the welding temperature so as to prevent obstruction of the welding process and which substantially diffuses into the melt during the welding.

---

This invention concerns a method of application welding metal workpieces, especially worn solid wheels of rail-going vehicles, by pouring liquid molten metals of identical or similar composition into a mould having the required dimensions, in which the prepared and preheated workpiece has been embedded as core, fusion of the connecting point being caused by the heat content of the metal poured in.

The method in its basic moves in fact is similar to known casting welding for mending defective gray castings, but differs therefrom in essential features.

In known casting welding the casting to be mended after moulding in the part to be applied is pre-heated in the transition region to a temperature below the melting point.

The heat content of the molten liquid cast iron however is not sufficient to fuse the workpiece at the transition point because the heat flux into the colder workpiece is excessive. At the adequately high pre-heating temperature for the fusing up to the upper red heat region subject to the influence of atmospheric air a layer of scale will form rapidly however which owing to the low specific heat conductivity stops the heat transfer from the melt to the workpiece and so prevents fusing.

This surface scaling can in fact be prevented in that the heating and casting operation is shifted to an atmosphere of inert gas or gas of reduced activity. This possibility however is not used in practice for technological manufacturing reasons.

In order nevertheless to obtain fusing of both parts, the mould in the known method is provided with an outlet, through which molten liquid cast iron is allowed to flow until the workpiece surface becomes molten due to the constant heat transfer. Only then is the discharge opening blocked up. Now the cast iron remaining in the mould fuses with the workpiece inserted in the mould.

This known welding method is unfavourable for many series production operations, especially for application welding of worn solid wheels of rail-going vehicles, both from the technology of manufacture and heat technology.

The method according to the invention subject matter therefore avoids the flux of the melt through the mould and hence simplifies the application welding.

This however makes it necessary for the workpiece to be heated to such an extent at the surface where the application welding is to be effected that the heat excess of the melting material inflow in the mould is already sufficient in order before its setting to fuse the workpiece surface to such an extent that an intimate bond is obtained. This pre-heating of the workpiece now necessary in the upper red heat region, as already mentioned, necessitates a protection of the surface against scaling.

According to the invention the formation of a bond obstructing oxide coating is prevented by the fact that on the metallically pure workpiece surface to be application welded before pre-heating a thin coat of a metal is applied which at the pre-heating temperature is still sufficiently scale resistant.

This protecting metal, for example, in steel workpiece highly alloyed chromium nickel steel, has to be of such a nature that it dissolves during the fusing operation and diffuses into the molecular lattice of the surrounding material.

This protective coating is conveniently applied by way of the metal spray process. It is however also possible herein to use any other suitable process, for example a chemico-galvanic method, sinter application of metal dust and the like. In conjunction to the casting weld process directly on setting a surface compacting may take place utilising the residual heat.

An example for using the invention is presented by the application welding of worn solid wheels of rail-going vehicles and is illustrated in the accompanying drawing.

A complete wheel set before application welding first has its rim 2 of the solid wheel 1 skimmed on a lathe in order to obtain a metallically clean surface.

Subsequently the wheel rim surface 2 is provided with the above described protective coating. Subsequently, the rim is rapidly heated in a suitable device to the upper red heat region and lowered into the prepared permanent mould 4.

Then a proportioned quantity of steel of identical or similar composition is poured into the cavity 3 between mould and workpiece up to the shaded line, which steel sets in the mould after fusing on the rim.

The shutter 5 prevents the melting material from overflowing.

The method offers the economical advantage that compared to known automatic welding methods which require costly welding additives, cheaper wheel rim scrap can be melted down. The steel applied by casting relative to the basic material may also have deviating properties, e.g. higher wear resistance.

We claim:
1. A process of rebuilding worn wheels of rail-supported vehicles comprising the steps of applying a scale resistant protective skin to the rim of the wheel; then preheating the rim; then introducing it into a casting mold and pouring molten metal into the mold and in contact with the rim, the preheating temperature being sufficiently high to permit formation of an intimate homogeneous welding bond by heat transfer between the molten metal and the wheel rim and the scale resistant skin being formed of a material which preserves its scale resistance at the welding temperature so as to prevent obstruction of the welding process and which substantially diffuses into the melt during the welding.

2. The process of claim 1, wherein the molten metal has substantially the same composition as the said wheel rim.

3. The process of claim 1, wherein the said protective skin consists of a high alloy chrome-nickel steel.

4. The process of claim 1 wherein the welding is effected in the absence of a metallurgical or physical bonding agent.

5. The process of claim 1, wherein the wheel rim is mechanically cleaned prior to applying the scale resistant protective skin.

6. The process of claim 1, wherein the wheel rim is made of steel and is preheated to the red heat range.

7. A process of rebuilding worn wheels of rail supported vehicles subjecting the rim of the wheel to a thorough cleaning; then applying a scale resistant protective skin to the rim; then preheating the rim to red heat; then introducing it into a casting mold, and pouring molten metal of substantially the same composition as the wheel rim into the mold and in contact with the rim, the preheating temperature being sufficiently high to permit formation of an intimate homogeneous welding bond by heat transfer between the molten metal and the wheel rim without application of a metallurgical or physical bonding agent and the scale resistant skin being formed of a material which preserves its scale resistance at said welding temperature so as to prevent obstruction of the welding process and which substantially diffuses into the melt during the welding.

References Cited

UNITED STATES PATENTS

| | | | |
|---|---|---|---|
| 736,190 | 8/1903 | Zell | 295—8 |
| 856,677 | 6/1907 | Blair | 295—8 |
| 1,374,321 | 4/1921 | Phillips | 167—47 |
| 2,445,583 | 7/1948 | Moroco | 164—92 |
| 3,276,082 | 10/1966 | Thomas | 164—75 |

CHARLIE T. MOON, *Primary Examiner.*

J. C. CLINE, *Assistant Examiner.*